Jan. 11, 1944. P. W. NOSKER 2,338,732
SYSTEM FOR MEASURING FORCE AND ACCELERATION
Filed July 9, 1941 3 Sheets-Sheet 1
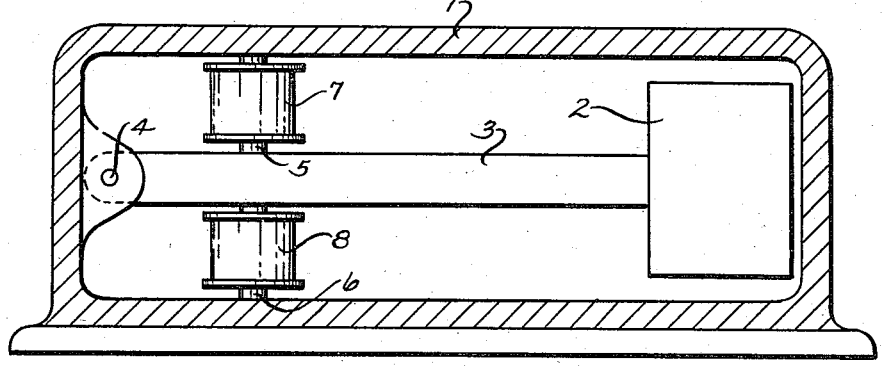
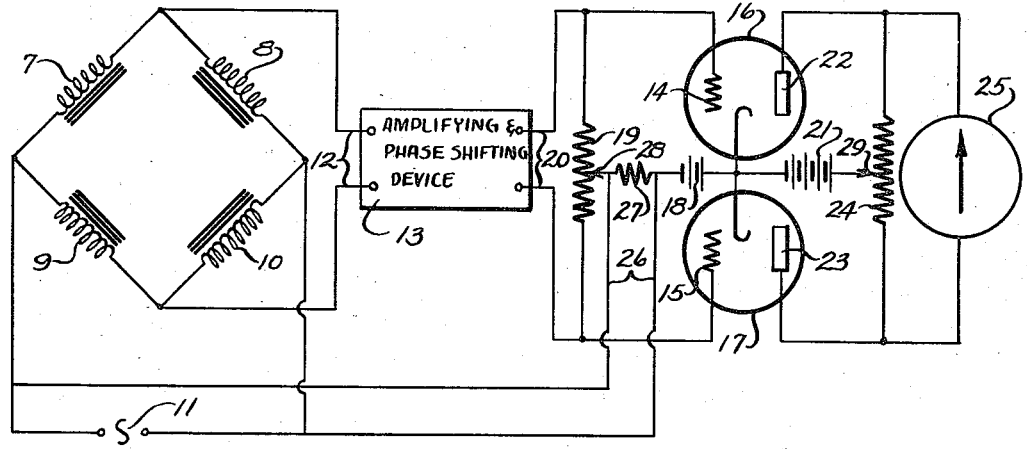
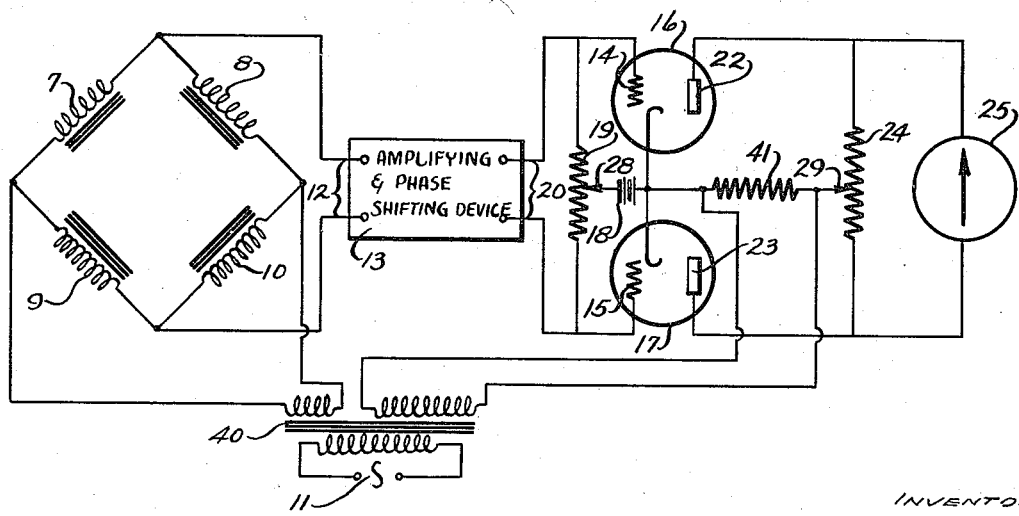
INVENTOR
PAUL W. NOSKER
BY
ATTORNEYS Jan. 11, 1944.  P. W. NOSKER  2,338,732
SYSTEM FOR MEASURING FORCE AND ACCELERATION
Filed July 9, 1941   3 Sheets-Sheet 2

INVENTOR
PAUL W. NOSKER

Patented Jan. 11, 1944

2,338,732

UNITED STATES PATENT OFFICE 2,338,732

SYSTEM FOR MEASURING FORCE AND ACCELERATION

Paul W. Nosker, Yellow Springs, Ohio

Application July 9, 1941, Serial No. 401,634

3 Claims. (Cl. 177—351)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the measurement of force and acceleration.

Broadly stated, the general object of the invention is to provide an improved system for measuring force and acceleration. A particular object is to provide a system for accurately measuring varying forces having comparatively high time rates of change, and a corollary object is to provide a system for accurately measuring varying accelerations having comparatively high time rates of change. A further object is to provide a device for the measurement of force and acceleration in which the responsive mechanism is made extremely rigid, so as to have a high natural vibration frequency. A still further object is to provide a sensitive alternating current bridge system capable of employing a rugged direct current instrument for indicating both the sense and degree of unbalance of the bridge.

The basic principle of the invention involves the utilization of the change in magnetic properties of magnetic materials under the influence of mechanical stress. I am aware that this phenomenon was known before my invention, and that prior systems and apparatus have been patented utilizing this phenomenon for force measurement. The present system, however, is believed to be superior to prior art systems, and to utilize the phenomenon in an improved and novel manner. The embodiments of the invention herein disclosed have particular reference to accelerometers for measuring accelerations having extremely high time rates of change, such as, for instance, the impact accelerations experienced by airplanes in landing. Ordinary known accelerometers are not suitable for such purposes because their natural vibration frequency is so low they cannot be depended upon to respond faithfully to such rapidly changing accelerations. The responsive mechanism of the present invention is made extremely rigid so as to have a high natural vibration frequency suitable for acceleration measurements over a far wider range than was heretofore possible, thereby appreciably extending the horizons of acceleration and stress investigations.

Where the apparatus must be carried upon the vehicle which suffers the impact, known indicating and recording mechanisms that are capable of sense discrimination in an A. C. bridge are found to be too fragile and to be incapable of high-frequency response to changing bridge conditions without responding also to fundamental and harmonic frequencies of the source of bridge excitation. Therefore, the present invention further comprises novel alternating current bridge systems, capable of employing rugged direct current indicating instruments which are better able to withstand rough treatment and adapted to produce simple indications that are free from components of the bridge exciting current. The fundamental advantage of this bridge indicator is that it is capable of producing in a short period galvanometer, an absolute deflection that is indicative of both sense and amount of bridge unbalance and yet that contains no components or harmonics of the bridge exciting current. The present invention is not limited, however, to the particular use above pointed out. It is equally well adapted to the conventional force measurements, and for such purposes the principles of the invention may be embodied in strain gages, scales, and the like. Additional uses and advantages will become apparent to one skilled in the art as the description proceeds in connection with the drawings, in which:

Fig. 1 is a sectional elevation view of an acceleration-responsive device embodying the principle of the invention;

Fig. 2 is a wiring diagram illustrating an impedance bridge balance system associated with the device shown in Fig. 1;

Fig. 6 is a wiring diagram similar to Fig. 2, but in which the alternating current input is applied to the plate circuit instead of the grid circuit of the push-pull vacuum tube arrangement.

Figure 3:
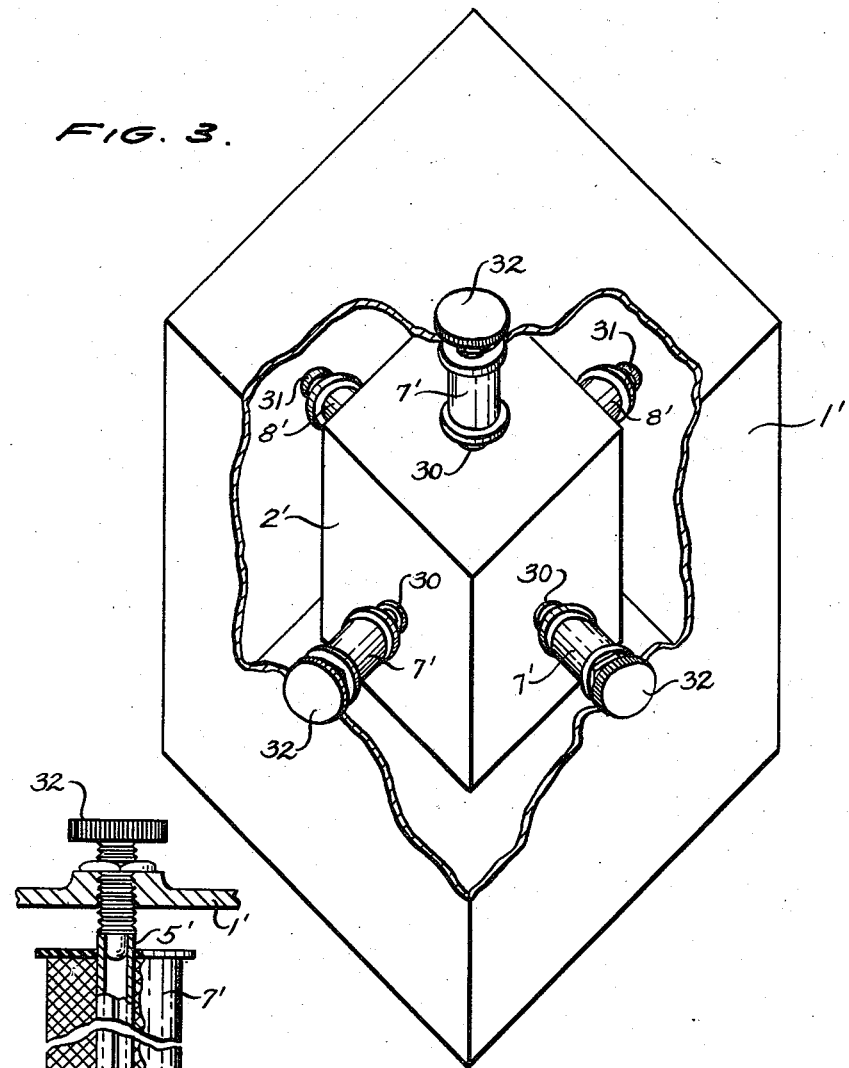
Fig. 3 is a broken away perspective view of a modified form of acceleration-responsive device.

The device of Fig. 1 comprises a casing 1 carrying a mass 2 on a lever arm 3 pivoted to the casing at the point 4 for vertical movement. Members of magnetic material 5 and 6 bearing against opposite sides of the casing 1 constrain the arm 3 against movement in a vertical plane. The members 5 and 6 carry the respective inductive windings 7 and 8.

It will be evident that when the casing 1 is subjected to an acceleration in a vertical direction, the inertia of the mass 2 will change the stress upon one of the elements 5 or 6. This change in stress in the element 5 or 6, as the case may be, will vary the inductance of the associated coil in accordance with well known principles. The coils 7 and 8 form respective variable impedance arms of an alternating current bridge comprising also the relatively fixed impedances 9 and 10. An alternating current source 11 serves as an input for the bridge circuit which is designed to be balanced when the casing 1 is undergoing zero acceleration.

A vertical acceleration, such as has been described, affects the magnetic properties of one of the elements 5 or 6, thus unbalancing the bridge and energizing the output circuit 12 leading to a combined amplifying and phase shifting device 13. The output 20 of the device 13 is fed into the grids 14, 15 of a push-pull vacuum tube combination indicated at 16, 17. It is of course understood that this push-pull arrangement may involve two separate tubes as shown, or a single twin tube. A resistance 19 is connected across the output 20. Grid bias is applied by the battery 18 or other source of potential. A battery or the like 21 applies plate potential to the plates 22, 23 through resistance 24. The numeral 25 represents a zero-center galvanometer or the like, connected between the vacuum tube plates 22 and 23. An alternating potential 26 from the source 11 is also fed into the input side of the push-pull vacuum tube combination, this potential being applied across a resistance 27, as shown. The connections at 28 and 29 are made adjustable for balancing the system.

Preliminary adjustments of the circuit constants in Fig. 2 are ordinarily made as follows: When the alternating current source 11 is completely disconnected from the system, the instrument 25 reads zero. When the alternating current source 11 is connected to the resistor 27 but disconnected from the bridge the meter 25 reads zero. When the alternating current source 11 is connected to the bridge in an unbalanced condition, but is disconnected from the resistor 27, the meter reads zero. The peak voltage from the alternating current source 11 should be sufficiently low to avoid plate current saturation in the vacuum tubes 16 and 17, and the grid bias should be of proper polarity and magnitude to produce half-wave rectifying action in each vacuum tube. A further requirement of adjustment is that the total phase change in the amplifying and phase shifting device 13 shall be such as to produce proper indication of the particular impedance component or components under observation. If the characteristics of the amplifier are such that this is inherently accomplished in the amplifier itself, the phase shifting device will be unnecessary, but if the amplification produces an unsuitable phase alteration, a phase shifter is necessary to effect the adjustment and to assure the proper phase relationship. The requirement in regard to any phase change is that a phase change of ninety degrees or two hundred seventy degrees shall not take place; preferably any phase change should be either zero or any multiple of one hundred eighty degrees. Since it may be that on the account of the characteristics of the amplifier, an undesirable change may take place, a phase shifter is necessary under such conditions to insure the proper phase relationship.

In operation, the system is adjusted so that the meter 25 in Fig. 2 indicates zero whenever the two members 5, 6 of Fig. 1 are subjected to stresses corresponding to zero acceleration on the casing 1. It is noted that when the accelerometer of Fig. 1 assumes a vertical position as illustrated, the bridge circuit will be rendered out of balance by the unequal stresses in the members 5 and 6 due to the static weight of the mass 2. In any event, regardless of the plane of operation of the accelerometer, the bridge may be balanced for zero output to the vacuum tube grids for any particular orientation of the accelerometer, representing the equilibrium condition for the entire system and the condition of zero acceleration for the accelerometer. When the stresses in the two members 5 and 6 vary with respect to each other, the inductance values of the coils 7 and 8 vary, creating a bridge unbalance by an amount which depends upon the magnitude of this stress differential and hence upon the magnitude of the applied acceleration. The amplified output from the unbalanced bridge, when applied to the vacuum tube grids, as shown causes one or the other of these tubes to pass the greater plate current, depending upon the direction of the bridge unbalance. The zero center instrument 25, therefore, shows by the direction of its deflection the sense of the applied acceleration and by the amplitude of its deflection the magnitude of the applied acceleration. It is of course understood that the acceleration is always applied to the casing 1 in a direction tending to swing the mass 2 about the pivot axis 4. In measuring accelerations having high time rates of change it is of course necessary to employ a type of meter 25 having a correspondingly high speed response, such as an oscillograph.

While the accelerometer of Fig. 1 has been described thus far in connection with the measurements of linear accelerations, it is also especially well suited for the measurement of rotational accelerations, in which case the pivotal axis 4 should be aligned coaxially with the axis of rotation of the body under investigation. The coils 7 and 8 will then respond to rotational accelerations of that body about the said axis.

Figure 4:
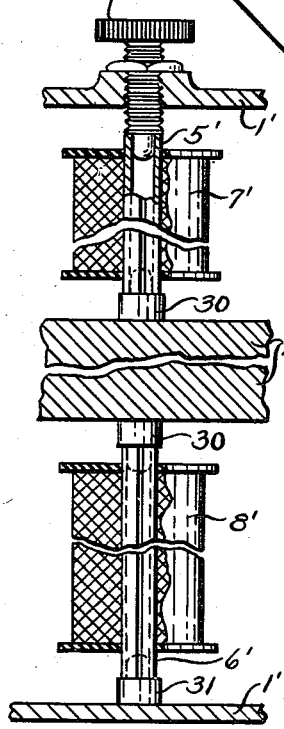
Fig. 4 is a sectional view on an enlarged scale of a portion of the device of Fig. 3.

Fig. 3 illustrates a modified accelerometer for response to linear accelerations in three directions, or along the three conventional coordinate axes. A casing 1' contains a mass 2' supported therein. The mass 2' is illustrated as provided with bosses or the like 30 on six sides for receiving the ends of slit tubular members of magnetic material, the other ends of the tubular members bearing against the inside of the casing 1'. The casing abutments for three of the tubular members may be fixed as shown at 31, and the other three casing abutments may be constituted by adjustable pressure means such as thumb screws 32. In this manner, the stresses in each of the three pairs of tubular members may be adjusted by one of the thumb screws 32 associated with each pair. This relationship is best illustrated in Fig. 4, wherein the block 31 represents the fixed abutment for the vertical tubular element 6' against the bottom of the casing 1'. Similar blocks or bosses 30 on opposite sides of the mass 2' accommodate the inner ends of the tubular members 5' and 6', and the assemblage is maintained in vertical position by means of the thumb screw 32 which may be tightened to apply an initial compression stress in equal amount to the pair of members 5' and 6'. Each of the two pairs of tubular members and associated elements shown in a horizontal plane in Fig. 3 is also arranged like the pair of vertical members shown in Fig. 4, and corresponding reference numerals are applied thereto.

Surrounding each of the tubular members is an inductance coil such as the coils 7' and 8'. Any such pair of inductance coils may then be incorporated into the bridge system of Fig. 2, in place of the coils 7 and 8, to measure the acceleration in the direction of each coordinate axis. This will require three independent bridge systems, such as is illustrated in Fig. 2, with three indicating instruments or meters. It will be appreciated that the accelerometer of Fig. 3 is even more rigid than the accelerometer of Fig. 1, thus giving it an even higher natural frequency and adapting it to still more rapidly changing values. The casing I may be constructed like a box, as illustrated, and have a side which may be opened for assembling the apparatus, or it may take the form of an open framework or cage merely having members for engaging the thumb screws 32.

Either of the two accelerometers herein disclosed may be modified to function as simple force measuring instruments by merely providing means for application of the force to be measured to the mass 2 or 2', the reaction thereto being obtained through the casing of the device. If then, the various members of magnetic material are subjected to an initial stress, such as by means of the thumb screws 32 in Figs. 3 and 4, opposite directions of galvanometer deflection will be obtained for tension and compression stresses. This will be evident from the fact that a force applied in a given direction will produce opposite effects upon the two members of magnetic material to which the force is applied. That is to say, that if, for instance, in Fig. 4 the members 5' and 6' are initially stressed in compression by means of the thumb screw 32, and a downward force is applied to the mass 2', the compression on the lower member 6' will be increased while that on the upper member 5' will be decreased. If the force were acting upwardly upon the mass 2' the compression in the upper member 5' would be increased while that of the lower member 6' would be decreased, thus producing a bridge unbalance in the opposite direction, and an opposite direction of deflection of the instrument 25. This discussion applies to accelerations as well as to forces, since accelerations acting upon the casing produce forces in the members 5' and 6' by virtue of the inertia of the mass 2'.

While the restraining members of magnetic material for holding the mass 2 or 2' are disclosed as being compression members, tension members such as wires or the like in either an unstressed or initially stressed condition may be employed. To best utilize the magnetic properties of certain materials it may be desirable to apply the stress in tension, while other materials may yield the best results in compression. The compression elements in Fig. 3 are made in the form of slit tubes in order to reduce the electrical losses in an alternating current field as much as possible. While this form of compression element has been found most satisfactory, it is understood that the invention is not limited thereto, as any other shape or cross-section may be used which performs the required function.

Regardless of whether compression or tension members are employed, the members may be either initially stressed or unstressed in the accelerometer. If the members on opposite sides of the mass are initially unstressed, and not attached to the mass and to the casing, an applied force or acceleration will affect only one member of the pair, and consequently only one arm of the bridge. However, if both members of the pair are rigidly attached to the casing and to the mass, any deflection of the latter will then impose a stress upon both members of the pair, one member being stressed in compression and the other in tension. Such an arrangement is obviously not desirable in the system of Fig. 2 unless the magnetic properties of the members are such that they then produce opposite changes in inductance in the respective associated windings 7 and 8 or 7' and 8'. If the arrangement is such that an applied force or acceleration changes the inductance of both windings 7 and 8 in the same sense, then both 7 and 8 should be in the same arm of the bridge.

If the two members 5 and 6, or 5' and 6', are initially stressed either in compression, as shown, or in tension, a force or acceleration acting upon the mass will have opposite effect upon the initial stress values of the two members, which will oppositely vary the inductance values of windings 7 and 8 or 7' and 8'.

The accelerometer of Fig. 3 is designed primarily to measure accelerations of a linear nature. If rotational accelerations are also present, means may be provided for eliminating, or neutralizing, their effects, or certain components of the rotational acceleration may be allowed to be included with the linear acceleration values, if the total effects are sought. It is also within the scope of the invention to use the device of Fig. 3 for the measurement of rotational accelerations, but the accelerometer of Fig. 1 is at present preferred for this purpose.

Figure 5:
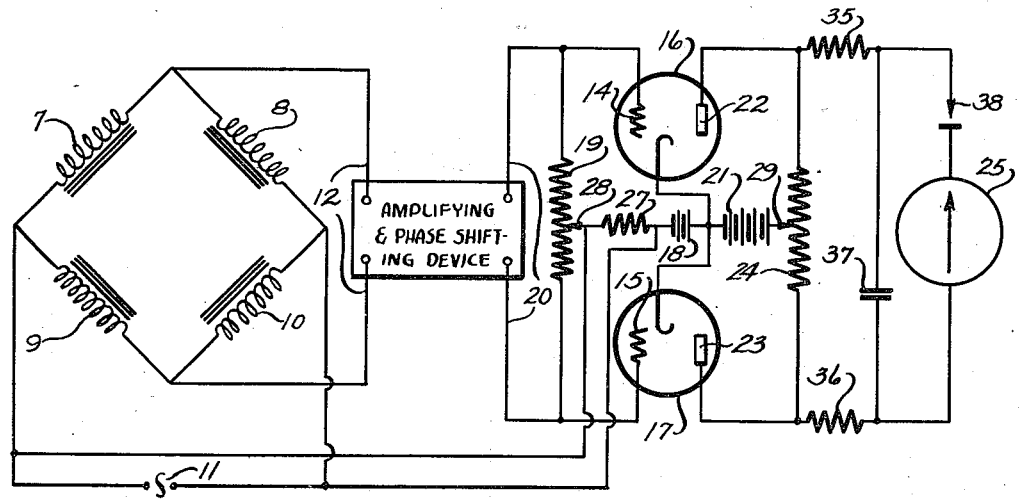
Fig. 5 is a wiring diagram similar to Fig. 2, but including a filter network and rectifier in the circuit of the indicating instrument.

The system of Fig. 5 is similar in general to the system of Fig. 2 and contains in addition a filter network consisting of the resistors or inductances 35 and 36, and the condenser 37, which together are for the purpose of rejecting the fundamental and harmonic frequencies from the source of alternating current 11. This filter network may, of course, be incorporated into any of the bridge systems herein illustrated.

The system of Fig. 5 also includes a rectifier 38 which permits current flow through the meter 25 in one direction only, preventing meter indication under certain conditions of bridge unbalance. The same effect may also be achieved by applying the amplifier output 20 to only one of the vacuum tubes 16 and 17. More generally speaking, an unbalanced detector circuit could be used in lieu of the balanced circuit heretofore described to give unequal sensitivity in the two possible senses of bridge unbalance, and this feature may be incorporated into any of the vacuum tube bridge systems herein illustrated. In Fig. 5, and in the remaining figures, corresponding elements are designated by like reference characters.

The system of Fig. 6 also corresponds in general to the system of Fig. 2, the fundamental difference being in the manner in which energy direct from the source of alternating current 11 is applied to the vacuum tubes 16 and 17. In Fig. 6 the source of alternating current 11 is connected, through any suitable matching network such as the transformer 40, to the terminals of a resistor 41, which is in series with the common plate return circuit of the vacuum tubes. The diode rectification thus effected in the system of Fig. 6 is more complete and steady and less dependent upon vacuum tube characteristics than the triode rectification employed in the systems of Figs. 2 and 5.

Relays or similar devices may be connected in to the circuits shown in the various figures in place of, or in addition to, the meter 25 and arranged to signal the existence of a predetermined state of bridge unbalance.

Figure 7:
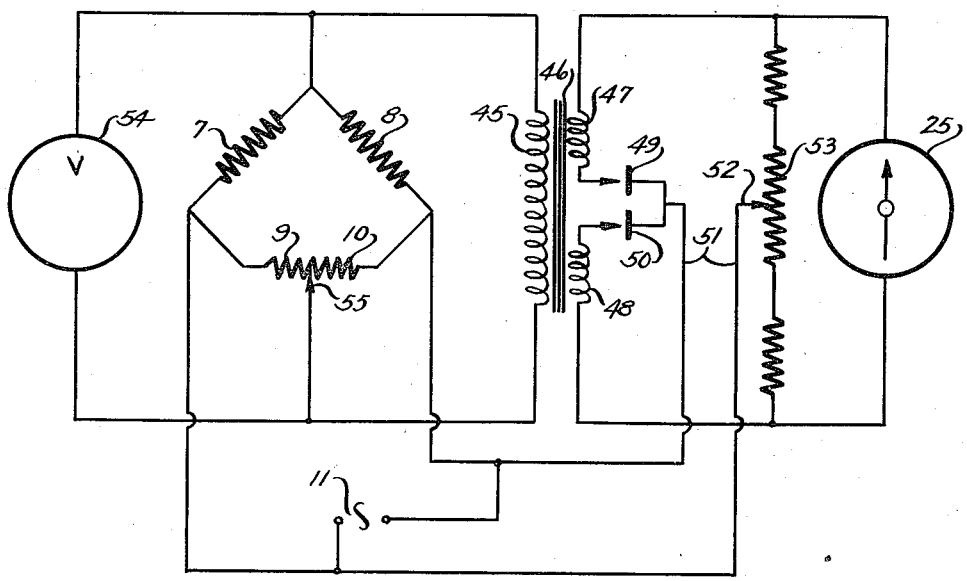
Fig. 7 is a wiring diagram of a further modification of an alternating current bridge circuit for operating a direct current instrument without the use of vacuum tubes.

Fig. 7 illustrates a bridge indicating system embodying the principles of the invention without the use of vacuum tubes. This system is particularly suitable for low impedance instruments such as oscillograph galvanometers and other current measuring devices. In this system, the output of the bridge is fed into a primary winding 45 of a coupling transformer 46 having a pair of secondary windings 47 and 48. The secondary windings are connected together through the rectifiers 49 and 50, the external circuit being completed through the instrument 25. The alternating current input to the bridge is also fed into the secondary circuit at 51 in the manner illustrated, one connection being between the rectifiers 49 and 50 and the other connection being to an adjustable contact 52 on the resistance 53. Secondary windings 47 and 48 are designed to produce equal and oppositely phased voltages so as to produce a null reading in the instrument 25 when the bridge is balanced. Now, describing the operation of the arrangement of Fig. 7 more specifically, it is to be noted that normally when the bridge is in balance, current is flowing from the source 11 through the load circuit including the balancing potentiometer 53, the secondaries 47 and 48 of the transformer 46 and the rectifiers 49 and 50. On alternate half cycles the current flows as just described, while, on intervening half cycles, the flow of current is prevented by the rectifiers. Now, if the bridge is unbalanced in one direction, the voltage induced in one of the secondaries 47 and 48 will reinforce the current flowing in its respective half of the divided load circuit while the other secondary will diminish the flow of current in its respective half of the divided load circuit. This effect takes place, of course, only during the half cycle in which any current flows. An unbalancing of the bridge in one direction will reinforce the corresponding half of each cycle of the alternating current input 51 to produce direct currents through the meter 25, resulting in a deflection in a given direction. Unbalancing of the bridge in the other direction will produce a voltage in the secondary windings reinforcing the other half of each cycle of the input 51 causing the direct currents to flow through the instrument 25 in the opposite direction to give a reverse deflection or indication. The numeral 54 represents a voltmeter to indicate the voltage present across the primary winding 45, and 55 designates a bridge balancing adjustment. The filter components described in Fig. 5 may be included if desired. Thus, it is seen that the system of Fig. 7 also provides for opposite directions of galvanometer deflection for positive and negative accelerations when the variable arms 7 and 8 of the bridge are incorporated in an accelerometer of the type herein disclosed.

It is noted that the impedances constituting the arms of the bridge in Figs. 2, 5 and 6 are represented as pure inductances, and that the bridge in Fig. 7 is represented as being a resistance bridge. These representations merely are for purposes of illustrating the principles of the invention, since all inductive windings must have a certain amount of resistance, and resistance elements commonly have a certain amount of inductance. The accelerometers of Figs. 1 and 3 are designed to affect primarily the inductive reactance of components of the bridge impedances and so the resistance values are of secondary importance in the operation of the present systems when used with these accelerometers. It is to be understood, however, that the bridge indicating systems in Figs. 2, 5, 6 and 7 may be made responsive to changes in any component of impedance, as is well understood in the art. For instance, the properties of the members 5 and 6, and 5' and 6', under stress may affect both the inductive reactances and the resistances of the bridge impedances, the system then being responsive to changes in both components. The bridge arms 7, 8, 9 and 10 accordingly are intended to represent impedances, generally, regardless of whether illustrated as inductances or resistances, and regardless of which component of the impedance produces the predominant responsive effect. Means, not shown in certain of the diagrams, must of course be provided to balance the bridge with respect to both resistance and reactance values, as is common in alternating current bridges.

The instrument 25 is preferably a voltage measuring instrument in the systems of Figs. 2, 5 and 6, while in the system of Fig. 7 a current measuring instrument may be used. The instrument may be of either A. C. or D. C. type, but the system in each instance is designed particularly for use with a D. C. instrument to obtain the advantages of sense indication and freedom from components or harmonics of the bridge exciting current in a system of a basically simple nature. Still further simplification of the system may be achieved if an instrument 25 having a center tapped coil is employed, the center taps being connected directly with 29 in Figs. 2, 5 and 6, and with 52 in Fig. 7, thus dispensing with resistances 24 and 53.

The improved impedance bridge balance indicating systems herein disclosed possess inherent advantages in measuring impedance values generally, apart from the measurement of force and acceleration. One such advantage is the independence of the galvanometer zero position and the sensitivity control setting, the latter being a gain control preferably associated with the amplifier. The gain control may take the form of a potentiometer in the input to the amplifier to adjust the range of values of bridge output, or may comprise a variable amount of inverse feed back, or other device known in the art.

A particular advantage of the present bridge balance system in combination with the accelerometers disclosed is the coexistence of mechanical and electrical zeros of the entire system. A system of this type in which the quantities to be measured are picked up and translated electrically has the further advantage of facilitating the incorporation of filter networks for rejection of unwanted or interfering frequencies and also the inherent advantage of being remote reading.

As a system of force and acceleration measurement, a primary advantage is that the responsive mechanism can be made extremely rigid so as to have a high natural vibration frequency. This high natural frequency is advantageous in any application involving the accurate determination of instantaneous values of rapidly changing quantities, but is of especial advantage in the measurement of rapidly varying accelerations such as are encountered in impact. The accelerometer herein described embraces an entirely new order of natural frequency many times higher than that displayed by conventional mechanical accelerometers of equal range.

The embodiments herein disclosed are intended as illustrative only and are not to be construed as limiting the invention. Further changes, therefore, may be made in the construction and arrangement within the scope of the appended claims.

I claim:

1. In a bridge balance indicator, an alternating current input to said bridge, a coupling transformer receiving the output from said bridge, the secondary of said coupling transformer comprising a pair of windings connected in series circuit through an indicating instrument, a potentiometer shunting said instrument, and a pair of opposed rectifier elements in said circuit, said alternating current input also having one terminal thereof connected with a movable contact on said potentiometer and having the other terminal thereof connected between said secondary windings.

2. An accelerometer comprising a casing, a mass within said casing, pairs of rigid members solidly engaging said mass to space the same from said casing and preventing substantial relative movement therebetween, the members of each pair being located on opposite sides of said mass and aligned with a coordinate axis through said mass, adjustable means on said casing for each of said pairs adapted to apply a stress through said members and said mass to insure the rigidity of support of said mass within said casing, each of said members comprising a radially and longitudinally slit tube of magnetic material having magneto-strictive properties, and an inductive winding on each of said members.

3. In a bridge balance indicator, an alternating current bridge, an alternating current input to said bridge, a coupling transformer, an indicating instrument, the secondary of said coupling transformer comprising a pair of windings connected in series circuit through said instrument, a potentiometer shunting said instrument, and a pair of opposed rectifier elements in said circuit between said secondary windings, and a circuit connecting said rectifier elements through said bridge with a movable contact on said potentiometer, said first circuit being connected to the output of said bridge and to said alternating current input through said rectifier elements and said coupling transformer.

PAUL W. NOSKER.